United States Patent
Vollkommer et al.

[15] 3,691,138
[45] Sept. 12, 1972

[54] PROCESS FOR THE POLYMERIZATION OF $\alpha,\alpha$-DIALKYL-$\beta$-PROPIOLACTONES

[72] Inventors: Norbert Vollkommer, Troisdorf; Roshdy Ismail, Neunkirchen; Moustafa El-Chahawi, Troisdorf, all of Germany

[73] Assignee: Dynamit Nobel AG, Troisdorf, Germany

[22] Filed: July 2, 1970

[21] Appl. No.: 60,219

[30] Foreign Application Priority Data

July 3, 1969 Germany..........P 19 33 730.5
Dec. 23, 1969 Germany..........P 19 64 360.8

[52] U.S. Cl.........260/78.3 R, 252/431 N, 252/431 P
[51] Int. Cl. ............................................C08g 17/017
[58] Field of Search....................................260/78.3

[56] References Cited

UNITED STATES PATENTS 3,268,486 8/1966 Kloofwijk..................260/78.3
3,476,715 11/1969 Wagner....................260/78.3

*Primary Examiner*—William H. Short
*Assistant Examiner*—E. A. Nielsen
*Attorney*—Burgess, Dinklage & Sprung

[57] ABSTRACT

In production of polyesters from a $\alpha,\alpha\alpha$-substituted-$\beta$-propiolactones, amides of acids of phosphorus are used as initiators for the polymerization.

9 Claims, No Drawings

PROCESS FOR THE POLYMERIZATION OF α,α-DIALKYL-β-PROPIOLACTONES

BACKGROUND

The process concerns the polymerization of α,α-dialkyl-β-propiolactones with the aid of amides of phosphorous acid or of phosphoric acid as initiators.

The invention has as its object the preparation of high molecular weight polyesters, through the polymerization of α,α-dialkyl-substituted β-propiolactones, which can be manufactured, e.g., as films, filaments or molded bodies from the polymerization products by known procedures.

It is known that alkyl substituted propiolactones are polymerized with the help of both acidic and basic initiators.

The use of acidic catalysts (specifically Friedel-Crafts catalysts) permits only relatively low molecular weight products, which are little suited for industrial objects.

As a rule, much higher molecular weights are obtained with basic initiators.

Up to this time the following were proposed: inorganic bases (alkali metal hydroxides), alkali metals (Li, Na, K), alcoholates and phenolates, salts of organic acids as well as organic sulfides, sulfoxides and sulfonium compounds.

Further, organometallic compounds (alkyls of alkali metals, of zinc, of cadmium, of aluminum and of boron) as well as Grignard compounds were proposed as initiators.

THE INVENTION

The invention provides a process for the polymerization of α,α-dialkyl-β-propiolactones, which is distinguished in that N-alkyl substituted acid amides of three- or five-valent phosphorus of the general formula

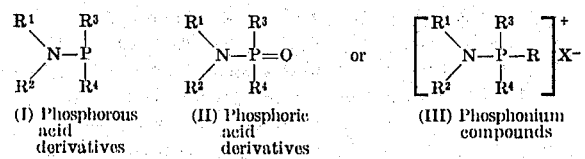

(I) Phosphorous acid derivatives  (II) Phosphoric acid derivatives  (III) Phosphonium compounds are employed as initiators.

The radicals $R^1$ and $R^2$ can be identical or different aliphatic radicals; $R^1$ and $R^2$ organic aliphatic radicals, preferably alkyl radicals, such as alkyl of one to eight carbon atoms, preferably one to four carbon atoms; $R^1$ and $R^2$ can together with the amide nitrogen form a heterocycloaliphatic radical which is mono or poly nuclear, e.g., morpholino or piperidino.

$R^3$ or $R^4$ each represents identical or different radicals of the group aryl radical, e.g., mononuclear aryl, e.g., phenyl; alkyl, e.g., of one to eight, better one to four, carbon atoms; aryloxy, e.g., phenoxy; alkyl substituted, e.g., lower ($C_1$-$C_4$) alkyl substituted mononuclear aryl, e.g., benzyl; alkoxy, e.g., $C_1$-$C_8$, preferably $C_1$-$C_4$ alkoxy; or the radical $-NR^1R^2$.

R is a radical of the group alkyl, e.g., of one to eight, or one to five carbon atoms; aralkyl; aryl substituted alkyl, e.g., where the aryl is mononuclear and the alkyl is of one to five carbon atoms, $X^-$ is a monovalent anion, preferably a halogen ion.

The heterocyclic rings can be mono- or poly-nuclear and as indicated in some cases include a heteroatoms 0 or N atom. The alkyl radicals preferably consists of alkylradicals with one to eight carbon atoms.

Three $-NR^1R^2$-groups on the P ion are preferred in the case of the $X^-$ -containing phosphonium compounds.

Phosphorous acid, phosphoric acid, phosphonous acid, phosphonic acid, phosphinous acid and phosphinic acid are denoted as acids of three or five valent phosphorus.

For example, the following amides of the acids, particularly the phosphorous acid and phosphoric acid, are suited as initiators: Tris-(dimethyl amide), Tris-(diethyl-amide), Tris-(methyl ethyl amide), Bis-(dimethylamide)-diethyl-amide, Tris-(dipropylamide), Tris-(dibutylamide), Tris-(diisobutylamide), Trimorpholino, Tripiperidino, Bis-(P-phenyl)-dimethylamide, P-phenyl-bis-(diethylamide), P-phenyl-dipiperidide, among others.

The aryl radical can be alkyl substituted.

The amides are to be prepared in an elementary manner (see Houben-Weyl, 4th Edition (1963), Vol. 12/2, page 108 and Michaelis: Liebigs Annalen 326 (1903), 177, 199). They are neither air nor moisture sensitive and therefore are much more easily handled than the organometallic compounds oftentimes used for lactone polymerization. A further benefit which appears from the application of the above-mentioned initiators of the invention, e.g., of phosphorous acid or phosphoric acid amides, lies in the improved thermal stability of the polyester in the working range. No fading appeared during a period of several hours in the melt at 250°C.

Initiators of the formula III, that contain the group

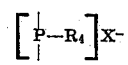

can be, as an example:
Tris-[dimethylamido]-methyl-phosphonium iodide
Tris-[dimethylamido]-ethyl-phosphonium bromide
Tris-[dimethylamido]-benzyl-phosphonium chloride
Tris-[dimethylamido]-benzyl-phosphonium bromide
Tris-[morpholino]-benzyl-phosphonium bromide
Tris-[piperidino]-ethyl-phosphonium bromide
Tris-[diethylamido]-ethyl-phosphonium bromide
Tris-[diethylamido]-benzyl-phosphonium chloride
Tris-[diethylamido]-benzyl-phosphonium bromide
Tris-[diethylamido]-n-pentyl-phosphonium chloride
Tris-[diethylamido]-pentyl-phosphonium bromide
Tris-[diisopropylamido]-benzyl-phosphonium chloride
Tris-[diisopropylamido]-benzyl-phosphonium bromide
Tris-[diisopropylamido]-n-pentyl-phosphonium chloride
Tris-[diisopropylamido]-n-pentyl-phosphonium bromide They are also differing alkylamido groups possible in the molecule.

The named compounds are easily accessible by already known methods through the adding together of reactants, followed by heating under certain circumstances, and in some cases in the presence of an inert diluent. (Houben-Weyl, 4th Edition, 1963 12/1. p. 347). They are stable, crystallized substances with relatively high melting points that can be easily purified through recrystallization. They are easily soluble in polar solvents like acetonitrile and benzonitrile and can be added to the polymerization ingredients in better controlled doses in the form of these solutions.

The use of phosphonium compounds as the initiators results in several advantages over use of the N-alkyl substituted amides of acids of phosphorus: they are substantially more active than the phosphorous acid amides so that one can manage with very small quantities of the initiator. The phosphonium compounds still permit a rapid polymerization at a concentration of $1 \times 10^{-6}$ to $2 \times 10^{-6}$ moles of initiator per mole of monomer; for example it is possible to produce about 1,000 kg of polymer with 3 to 4 grams of initiator.

Furthermore, substantially higher gram-molecular weights are obtained under otherwise identical reaction conditions (purity of monomer, solvent, other polymerization conditions), than is possible by the use of the phosphorous acid amides. Tris-(dialkylamido)-alkyl-phosphonium halides, as well-crystallized solids, are easier to purify than the other, oftentimes liquid, phosphorous acid amides, and they keep substantially better than the phosphorous acid amides, which are slowly changed through oxidation, hydrolysis and decomposition when stored for long periods.

The high polymerization speeds that are obtainable with these catalysts are of particular advantage. With the use of the amides of phosphorous acid, the polymerization is regularly completed in less than an hour.

As it will be apparent from the examples, molecular weights of poly-$\alpha,\alpha$-dialkyl-$\beta$-propiolactones are obtained which are far in excess of the minimum molecular weight of about 20,000 required for the production of filaments.

$\alpha,\alpha$-Dialkyl-$\beta$-propiolactones employed as raw materials for the polymerization have the general formula

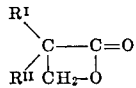

where $R^I$ and $R^{II}$ signify equal or different, in some cases halogen substituted, e.g., chloro substituted aliphatic radicals, preferably aliphatic radicals with one to eight carbon atoms, especially the alkyl radicals. Suitable starting materials are $\alpha,\alpha$-dimethyl-, $\alpha$-methyl-$\alpha$-ethyl, $\alpha,\alpha$-diethyl-, $\alpha,\alpha$-diisopropyl-, $\alpha$-ethyl-$\alpha$-butyl-, $\alpha$-ethyl-$\alpha$-hexyl-, $\alpha,\alpha$-di -(trichloromethyl)-$\beta$-propiolactone and others.

The preparation of the substituted propiolactones can follow the U.S. Pat. Nos. 3,326,938 and 3,291,810.

The polymerization can be accomplished in the presence of solvents as well as "in bulk", i.e., the polymerization is accomplished in the absence of solvents or diluents, where nevertheless a small quantity of solvent can be used to dissolve the initiator.

Suitable solvents are aliphatic, cycloaliphatic and aromatic hydrocarbons, halogenated hydrocarbons, ethers, esters, nitriles, and others. In addition to those solvents mentioned in the examples a suitable, easily accessible solvent of the mentioned groups are hexane, cyclohexane, benzene, trichloroethane, ether as dialkylether, ester like acetic ester, nitrile as acetonitrile, cyclic carbonates, and others.

The quantity of solvent is not limited, although with too large a quantity the molecular weight and polymerization speed are depressed.

If the polymer is insoluble in these solvents then the polymerization has the character of a precipitation polymerization.

The polymerization temperature with the use of the mentioned initiators, as is the case with other reaction conditions, can be those known in the art for the polymerization, and can lie between room temperature and the melting temperature of the polyester, but generally not over 250°C. The range between 50° and 100°C can be considered as the most favorable polymerization temperature.

At the finish of the polymerization, the volatile constituents of the mixture (residual monomer, solvent, diluent for the initiator) are removed under vacuum at 60°–90°C, for example. The polyester can then be used without further purification.

The determination of the gram-molecular weight of the polyester yielded in the following examples can be determined through the measurement of the "inherent viscosity." The relation $$\mu_{inh} = 3 \times 10^{-4} M^{0.8}$$

is used for the conversion of "inherent viscosity" to the gram-molecular weight (see Brit. Patent 1,066,122).

$$\eta_{inh} = \frac{ln_{\eta_{rel}}}{c}$$

In the equation $\mu_{rel} = t/t_o$, i.e., the ratio of the time of flow of the solution ($t$) to the solvent ($t_o$) in an Ostwald viscosimeter; $c$ is the concentration of the solution in g/100 ml.

The measurements were taken in trifluoroacetic acid at 25°C. The concentration amounted to 0.5 g/100 ml.

The determination of the melting temperatures and the decomposition temperatures are performed by differential thermal analysis and by thermogravimetric analysis.

EXAMPLE 1

Thirty grams ($3 \times 10^{-1}$ mole) of $\alpha,\alpha$-dimethyl-$\beta$-propiolactone are poured in a dry polymerization vessel and $2.44 \times 10^{-3}$ grams ($1.5 \times 10^{-5}$ mole) of phosphorous acid-tris-(dimethylamide) in a solution of 15 ml of petroleum ether are added. Consequently the mole ratio of initiator to lactone amounts to $5 \times 10^{-5}$.

The mixture is heated to 80°C in a thermostatic bath.

After a few minutes the polymer begins to precipitate and after 1/2 hour the mixture is completely polymerized. At the finish of the polymerization the volatile ingredients are removed under vacuum at 80°C. 29.5 grams of poly-$\alpha,\alpha$-dimethyl-$\beta$-propiolactone are yielded; the transformation amounts to 98 weight percent. The polyester possesses an "inherent viscosity" of 1.64 corresponding to a gram-molecular weight of about 46,000. The melting temperature amounts to 228°C, the decomposition temperature to 300°C (rate of heating 8°C/min; loss in weight 1 percent.

For a period of 1.5 hours at 250°C in the melted state, the polymer undergoes no kind of discoloration.

EXAMPLE 2

Example 1 is repeated, however 39 grams of α,α-diethyl-β-propiolactone are used instead of the dimethyl compound.

The gram-molecular weight and the thermal stability of the polymer correspond to Example 1.

EXAMPLE 3

Example 1 is repeated as stated there, however 49 grams of α-ethyl-α-n-butyl-β-propiolactone are used instead of the dimethyl compound. The gram-molecular weight and thermal stability correspond to those in example 1. The melting temperature of the polyester amounts to 175°C.

EXAMPLE 4

$4.88 \times 10^{-3}$ grams ($3 \times 10^{-5}$ mole) of phosphorous acid-tris (dimethylamide) in a solution of 3 ml of petroleum ether are added to 60 grams ($6 \times 10^{-1}$ mole) of α,α-dimethyl-β-propiolactone in a polymerization vessel. The mole ratio of initiator to monomer amounts to $5 \times 10^{-5}$.

The mixture is heated in a thermostatic bath to 50°C. After a few minutes the polymerization begins and after an hour the mixture becomes solid. It is left for 10 hours at the polymerization temperature. The volatile ingredients remaining are removed under vacuum.

59.4 grams of poly-α,α-dimethyl-β-propiolactone are obtained; the transformation is nearly quantitative.

The "inherent viscosity" of the polymer amounts to 1.71, the gram-molecular weight is about 48,000.

The melting temperature and decomposition temperature are like those of the polymer from Example 1. The polyester undergoes no discoloration within three hours in the melt at 250°C.

EXAMPLE 5

$2.47 \times 10^{-4}$ grams ($1 \times 10^{-6}$ mole) of phosphorous acid-tris-(diethylamide) in a solution of 0.1 ml of petroleum ether are added to 2 grams ($2 \times 10^{-2}$ mole) of α,α-dimethyl-β-propiolactone and the mixture heated to 80°C.

The separation of the polymer is established immediately and after about 10 minutes the mixture becomes solid. After 5 hours the polymerization is terminated and the volatile constituents removed under vacuum.

A poly-α,α-dimethyl-β-propiolactone is obtained in an almost quantitative transformation with an "inherent viscosity" of 1.55 and a gram-molecular weight of about 42,000.

EXAMPLE 6

$4.95 \times 10^{-4}$ grams ($2 \times 10^{-6}$ mole) of phosphorous acid-tris-(diethylamide) in a solution of 0.2 ml of petroleum ether are added to a solution of 4 grams ($4 \times 10^{-2}$ mole) of α,α-dimethyl-β-propiolactone in 2 grams of toluene (concentration of the solution: 66.6 weight percent) and the mixture heated to 80°C. Polymerization is established with ebullition of the mixture. After a few minutes the mixture becomes solid.

After 3 hours all together the polymerization is terminated and the volatile ingredients removed under vacuum at 80°C. 3.8 grams of poly-α,α-dimethyl-β-propiolactone are isolated corresponding to a transformation of 95 weight percent.

The polyester possesses an "inherent viscosity" of 1.68 and therefore a gram-molecular weight of about 47,000.

Equal results are obtained if instead of toluene as a solvent equal parts of dioxane, tetrahydrofuran or acetonitrile are used.

EXAMPLE 7

$4.33 \times 10^{-4}$ grams ($1.5 \times 10^{-6}$ moles) of phosphorous acid trimorphalide in 0.15 ml of dioxane are added to 3 grams ($3 \times 10^{-2}$ mole) of α,α-dimethyl-β-propiolactone. The mole ratio of initiator to lactone amounts to $5 \times 10^{-5}$.

The mixture is heated to 80°C. After a few minutes the polyester begins to deposit and after about 30 minutes the mixture becomes solid. It is left for a total of 3 hours at 80°C. After the removal of the volatile ingredients under vacuum at 80°C, 2.9 grams of poly-α,α-dimethyl-β-propiolactone can be isolated.

The polyester possesses an "inherent viscosity" of 1.42 and consequently a gram-molecular weight of about 38,000.

EXAMPLE 8

$3.58 \times 10^{-2}$ grams ($2 \times 10^{-4}$ mole) of phosphoric acid-tris-dimethylamide in a solution of 0.2 ml of toluene are added to 10 grams (0.1 mole) of α,α-dimethyl-β-propiolactone. The mole ratio of initiator to monomer amounts to $2 \times 10^{-3}$.

The mixture is heated in a thermostatic bath to 80°C.

After a few minutes the polymer begins to separate and after about 45 minutes the mixture becomes solid.

It is left at 80°C for 16 hours.

9.8 grams of poly-α,α-dimethyl-β-propiolactone is obtained; the transformation is 98 weight percent.

The polymer possesses an "inherent viscosity" of 2.49 and a gram-molecular weight of about 76,000. With longer (>0.5 hours) heating above the melting temperature (250°C) a weak gray discoloration occurs.

EXAMPLE 9

3 grams ($3 \times 10^{-2}$ mole) of α,α-dimethyl-β-propiolactone are poured in a dry polymerization vessel and $2.68 \times 10^{-4}$ grams ($1.5 \times 10^{-6}$ mole) of phosphoric acid-tris-(dimethylamide) in 0.15 ml of petroleum ether are added. The mole ratio of initiator to lactone amounts to $5 \times 10^{-5}$.

The mixture is heated in a thermostatic bath to 80°C. After several hours the mixture becomes solid. The mixture is left for a total of 24 hours at 80°C. Volatile constituents are removed under vacuum at 80°C at the termination of the polymerization.

Exactly 3 grams of poly-α,α-dimethyl-β-propiolactone are obtained. The transformation is almost quantitative.

The polyester possesses an "inherent viscosity" of 1.53 and correspondingly a gram-molecular weight of about 41,000.

The polymer has a melting temperature of 230°C, a decomposition temperature of 300°C and withstands 1.5 hours in the molten state at 250°C with no discoloration.

EXAMPLE 10

$3.94 \times 10^{-2}$ grams ($1.5 \times 10^{-4}$ mole) of phosphoric acid-tris-(diethylamide) in 0.15 ml of petroleum ether are added to 3 grams ($3 \times 10^{-2}$ mole) of $\alpha,\alpha$-dimethyl-$\beta$-propiolactone. The mole ratio of initiator to monomer amounts to $5 \times 10^{-3}$.

The mixture is heated in a thermostatic bath to 80°C and polymerized for 16 hours. After the termination of the polymerization the volatile ingredients are removed under vacuum.

The polyester is obtained in nearly quantitative yield. It possesses an "inherent viscosity" of 1.33 and has therefore a gram-molecular weight of 36,000.

EXAMPLE 11

$8.28 \times 10^{-4}$ grams ($3 \times 10^{-6}$ mole) of phenylphosphorous acid dipiperidide in 0.2 ml of petroleum ether are added to 3 grams ($3 \times 10^{-2}$ mole) of $\alpha,\alpha$-dimethyl-$\beta$-propiolactone. The mole ratio of initiator to monomer amounts to $1 \times 10^{-4}$.

The reaction mixture is heated in a thermostatic bath to 70°C. The polymerization is established after a few minutes and the mixture is completely polymerized after an hour. Therefore after 2 hours the polymerization is terminated and the volatile reactants removed under vacuum.

The isolated polyester in quantitative yield possesses an "inherent viscosity" of 1.41 and a gram-molecular weight of about 38,000.

EXAMPLE 12

Eighteen grams (0.18 mole) of pivalolactone ($\alpha,\alpha$-dimethyl-$\beta$-propiolactone), distilled over calcium hydride, and 12 grams of petroleum ether (boiling range 80°–100°C), dried over metallic potassium, are added to a reaction vessel which has been rinsed with nitrogen. After the solution of the monomer has been brought to the polymerization temperature of 80°C, $7.8 \times 10^{-5}$ grams ($2.7 \times 10^{-7}$ mole) of tris-[dimethylamido]-benzyl-phosphonium chloride dissolved in 0.6 ml of acetonitrile are added to the polymerization mixture under stirring. The mole ratio of initiator to monomer amounts to $1.5 \times 10^{-6}$. The polyester immediately begins to separate in the form of small particles. The stirrer is stopped, and after about 0.5 hours the mixture is completely polymerized to a solid colorless mass. After a further 3.5 hours the experiment is terminated, the polymer pulverized, extracted with hot methanol for the removal of the residual monomer and dried to constant weight. It yields 17.6 grams of poly-$\alpha,\alpha$-dimethyl-$\beta$-propiolactone; the transformation amounts to about 98 percent. The polyester possesses an "inherent viscosity" of 3.94 corresponding to a gram-molecular weight of about 140,000.

EXAMPLE 13

5.6 grams ($5.6 \times 10^{-2}$ mole) of pivalolactone and $1.6 \times 10^{-5}$ grams ($5.6 \times 10^{-8}$ mole) of tris-[dimethylamido]-benzyl-phosphonium chloride dissolved in 0.2 ml of acetonitrile are added to a polymerization vessel which has been rinsed with dry nitrogen. The mole ratio of initiator to pivalolactone amounts to $1 \times 10^{-6}$. The mixture is heated to 80°C. Polymerization sets in immediately and in a few minutes proceeds to the end with boiling of the monomer. The polymer is isolated as in example 12. It yields 5.1 grams of polyester; the transformation is 91 percent. The "inherent viscosity" amounts to 3.48; the gram-molecular weight is about 135,000. The polyester melts at 230°C (DTA) and shows no discoloration at 270°C in the molten state.

EXAMPLE 14

In Example 14 under the same conditions as Example 12, 75 grams (0.75 mole) of $\alpha,\alpha$-dimethyl-$\beta$-propiolactone, 50 ml of petroleum ether and $5.6 \times 10^{-4}$ grams ($1.5 \times 10^{-6}$ mole) of tris-[diethylamido]-benzyl-phosphonium chloride, dissolved in 2 ml of acetonitrile, are used. The mole ratio of initiator to monomer amounts to $2 \times 10^{-6}$. The polymerization temperature is 70°C. The polymerization time amounts to 4 hours. It yields 73 grams of polymer; the transformation therefore amounts to 97 percent. The "inherent viscosity" amounts to 3.9; the gram-molecular weight is about 137,000.

EXAMPLE 15

Twelve grams (0.12 mole) of pivalolactone is polymerized in substance with $8.8 \times 10^{-4}$ grams ($2.4 \times 10^{-6}$ mole) of tris-[morpholino]-benzyl-phosphonium chloride. The mole ratio initiator:pivalolactone = $2 \times 10^{-5}$. The polymerization temperature amounts to 100°C. After 8 hours the polymerization is terminated and the polymer pulverized, extracted with methanol and dried. It yields 10.4 grams of polyester. The transformation amounts to 86 percent. The "inherent viscosity" of the polyester amounts to 3.46; the gram-molecular weight is about 115,000.

EXAMPLE 16

5.6 grams ($5.6 \times 10^{-2}$ mole) of $\alpha,\alpha$-dimethyl-$\beta$-propiolactone are polymerized with $9.8 \times 10^{-4}$ grams ($2.8 \times 10^{-6}$ mole) of tris-[morpholino]-ethyl-phosphonium bromide at 90°C for 6 hours. The initiator is added to the monomer in the form of a solution in benzonitrile. The mole ratio initiator:monomer amounts to $5 \times 10^{-5}$. 5.1 grams of polyester are obtained which corresponds to a transformation of 91 percent. The polyester possesses an "inherent viscosity" of 3.3 and therefore a molecular weight of about 110,000.

EXAMPLE 17

Twenty grams (0.2 mole) of pivalolactone are dissolved in 20 grams of petroleum ether (boiling range 80°–100° C). The solution is heated to the polymerization temperature of 70°C, then $3.9 \times 10^{-4}$ grams ($1 \times 10^{-6}$ mole) of tris-[piperidino]-ethyl-phosphonium bromide in the form of a solution in acetonitrile are added to the mixture. The mole ratio of initiator to lactone amounts to $5 \times 10^{-6}$. The time of polymerization is 5 hours. 18.7 grams are isolated; the transformation amounts to 93 percent. The "inherent viscosity" is 3.6; the gram-molecular weight amounts to about 120,000.

EXAMPLE 18

Five grams ($5 \times 10^{-2}$ mole) of pivalolactone are dissolved in 5 grams of benzoic acid methyl ester and the solution brought to the polymerization temperature of 150°C. Then 2 × 10$^{-5}$ grams (7.5 × 10$^{-8}$ mole) of tris-[dimethylamido]-ethyl-phosphonium bromide in the form of a solution in benzonitrile are added as the initiator. The mole ratio initiator:lactone amounts to 1.5 × 10$^{-6}$. The progressive polymerization becomes evident in the increasing viscosity of the mixture. After about 40 minutes a colorless, transparent gel is formed, which nevertheless becomes turbid as the polymerization progresses. After 5 hours the experiment is terminated, the non-transparent solidified mixture pulverized, extracted with methanol and dried. 4.6 grams of polyester with an "inherent viscosity" of 2.1 and a gram-molecular weight of about 58,000 are obtained.

EXAMPLE 19

Example 18 is repeated, however with the use of equivalent parts of α,α-di-n-propyl-β-propiolactone instead of pivalolactone, a corresponding result is obtained.

EXAMPLE 20

Propylene carbonate is employed as the solvent for the monomer under reaction conditions similar to Example 18. 4.6 grams of polypivalolactone with an "inherent viscosity" of 1.48 and a gram-molecular weight of about 40,000 are obtained.

EXAMPLE 21

Six grams of pivalolactone are dissolved in 6 grams of p-toluic acid methyl ester, the solution brought to the polymerization temperature of 100°C and 2.9 × 10$^{-5}$ grams (6 × 10$^{-8}$ mole) of tris-[diisopropyl-amido]-pentyl-phosphonium bromide are added as the initiator. The mixture solidifies to a transparent gel, which, however, becomes non-transparent with progressive polymerization. After 6 hours the polymerization is terminated, the polymer pulverized and extracted with methanol. 5.6 grams of polyester with an "inherent viscosity" of 3.14 and a gram-molecular weight of about 100,000 are obtained.

What is claimed is:

1. In the polymerization of α,α-substituted-β propiolactone wherein each α subsituent is alkyl or halogen substituted alkyl, to form a polyester, wherein the polymerization is performed in the presence of an initiator, the improvement which comprises using as the initiator a three or five valent phosphorus compound, said phosphorus compound being:

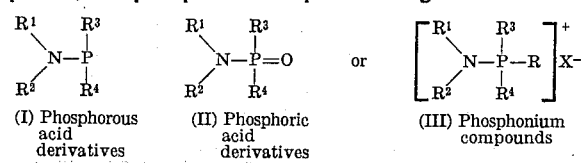

(I) Phosphorous acid derivatives    (II) Phosphoric acid derivatives    (III) Phosphonium compounds or a mixture thereof, wherein:

$R^1$ and $R^2$ is each an alkyl or together with the nitrogen form a morpholino or piperidino ring:

$R^3$ and $R^4$ is each aryl, or alkyl, or $-NR^1R^2$;

R is alkyl or aralkyl; and $X^-$ is a monovalent anion.

in an amount sufficient for initiating said reaction.

2. Process according to claim 1 wherein:

said α substituents of the propiolactones are each alkyl of one to eight carbon atoms or halogen substituted alkyl of one to eight carbon atoms;

$R^1$ and $R^2$ is each an alkyl of one to eight carbon atoms;

$R^3$ and $R^4$ is each phenyl or $-NR^1R^2$ as defined herein (claim 2);

R is alkyl of one to eight carbon atoms, or phenyl substituted alkyl wherein the alkyl is of one to five carbon atoms; and $X^-$ is halogen.

3. Process according to claim 2, wherein the initiator is phosphorus compound (I).

4. Process according to claim 2, wherein the initiator is phosphorus compound (II).

5. Process according to claim 2, wherein the initiator is phosphorus compound (III).

6. Process according to claim 2, the polymerization being carried out in bulk.

7. Process according to claim 2, the polymerization being carried out in a solvent for the propiolactone.

8. Process according to claim 2, the polymerization temperature being between room temperature and the melting point of the polyester.

9. Process according to claim 8, the polymerization temperature being 50°–100°C.

* * * * *